March 17, 1970 — G. W. GEHRKE — 3,500,977
RETAINER FOR OVERRUNNING CLUTCH WITH SPRING INSERT
Filed Feb. 21, 1968
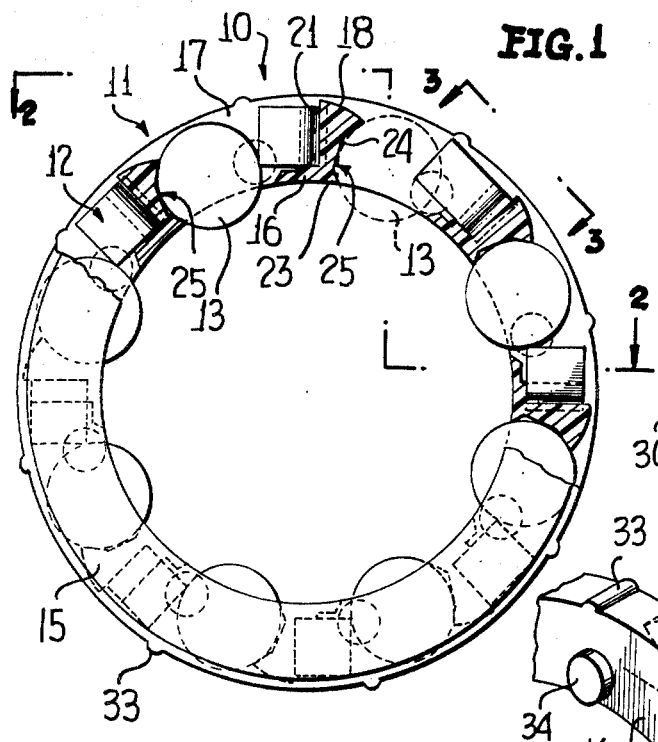
FIG.1
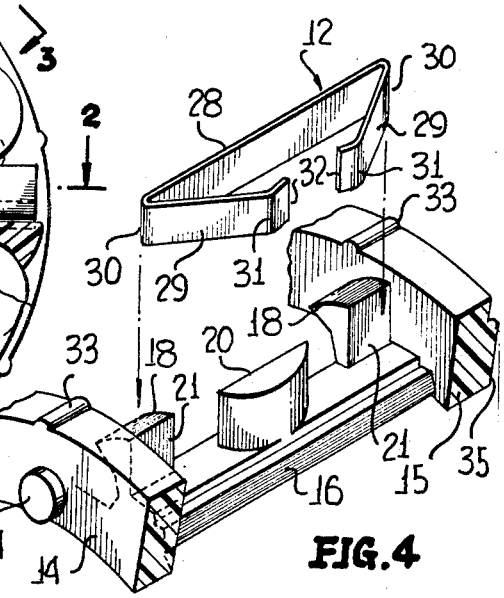
FIG.4
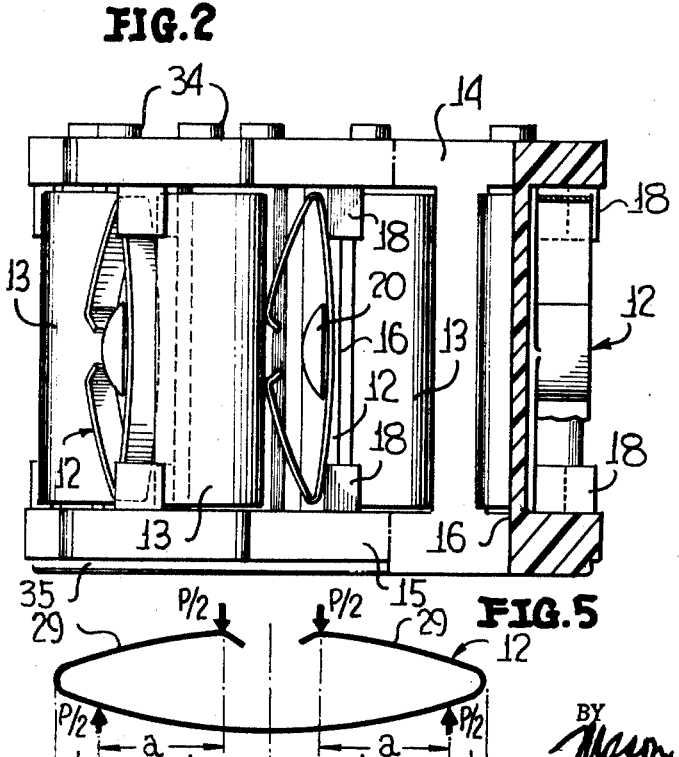
FIG.2
FIG.5
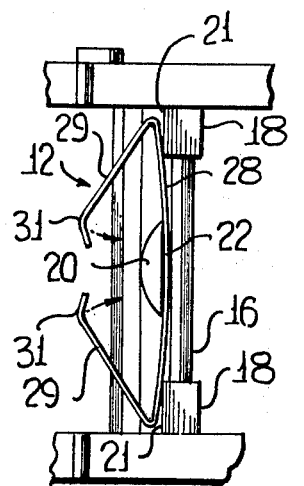
FIG.3
INVENTOR
GERARD W. GEHRKE
BY *Mason, Porter, Diller & Brown*
ATTORNEYS

United States Patent Office 3,500,977
Patented Mar. 17, 1970

3,500,977
RETAINER FOR OVERRUNNING CLUTCH WITH SPRING INSERT
Gerard W. Gehrke, Litchfield, Conn., assignor to The Torrington Company, Torrington, Conn., a corporation of Maine
Filed Feb. 21, 1968, Ser. No. 707,133
Int. Cl. F16d *13/04, 15/00, 41/06*
U.S. Cl. 192—45                                    11 Claims

ABSTRACT OF THE DISCLOSURE

This disclosure relates to a retainer for an overrunning roller clutch and specifically has to do with the construction and mounting the springs which react against the rollers. In overrunning clutches, it is desirable that all of the rollers simultaneously engage respective cam surfaces in driving relation when the clutch is engaged. In order to accomplish this, it is necessary that the rollers be spring loaded. While numerous retainers of this general type have been provided in the past, much difficulty from spring breakage has occurred, particularly with relatively small assemblies. It is now proposed to inexpensively form the retainer body of a readily moldable material, such as plastic, and to separately form the springs with the springs being of a construction which facilitates the mounting thereof in the retainer body and at the same time assures a long life under the intended loads.

---

This invention specifically relates to a retainer construction for overrunning roller clutches with particular emphasis being placed upon the construction of the springs of the retainer and the mounting thereof within the retainer body.

In the past, numerous attempts have been made to provide a commercially acceptable retainer for relatively small clutch units. The retainers have been of an all molded plastic construction with the springs being integrally formed. These retainers have numerous deficiencies with the primary one being spring breakage. However, these retainers have also been restricted to the more resilient expensive plastics.

A second alternative has been to form the entire retainer from sheet metal with the springs being integrally formed. In this type of retainer, it is necessary that the metal for the springs come from the metal displaced in the forming of the roller pockets. As a result, the springs are of an ineffective design.

A further attempt to provide a satisfactory retainer has been the formation of the retainer body from sheet metal and the springs from sheet metal with the springs being separately formed and attached to the retainer body. Once again the springs, primarily because of mounting difficulties, have been of an inefficient design.

In accordance with this invention, it is proposed to form a retainer for an overrunning roller clutch wherein the retainer body is inexpensively molded of plastic and the springs are separately formed from sheet metal, preferably steel, with the retainer body being of a construction wherein springs of a highly efficient type may be readily mounted therein.

Another feature of the invention is the provision in a retainer for an overrunning roller clutch of a spring which is a simply supported bow type, which spring has proved to be highly desirable both from a cost and a life expectancy standpoint.

Another object of this invention is to provide a novel retainer assembly for overrunning roller clutches wherein the retainer body may be readily molded of an inexpensive plastic material and be of a construction wherein springs of an efficient type may be readily mounted on cross bars thereof and means for mounting the springs may be utilized to also facilitate the retention of rollers as a part of the retainer assembly.

With the above and other objects in view that will hereinafter appear, the nature of the invention will be more clearly understood by reference to the following detailed description, the appended claims and the several views illustrated in the accompanying drawing.

In the drawing:

FIGURE 1 is an end view of the retainer assembly with portions of one of the end rings thereof being broken away and several of the cross bars shown in section so as to clearly illustrate the relationship of the components of the retainer assembly.

FIGURE 2 is a fragmentary plan view with parts in section of the retainer assembly of FIGURE 1.

FIGURE 3 is a fragmentary plan view of the retainer assembly showing but a single cross bar and the single spring.

FIGURE 4 is an enlarged fragmentary exploded perspective view showing that portion of the retainer assembly illustrated in FIGURE 3, but rotated 180 degrees.

FIGURE 5 is a schematic force diagram of one of the springs.

Referring now to the drawing in detail, it will be seen that there is illustrated a retainer assembly which is particularly adapted for use as part of an overrunning roller clutch assembly, the retainer assembly being generally referred to by the numeral 10. The retainer assembly 10 is made up of three basic components. These include a retainer body 11, a plurality of springs, which are generally referred to by the numeral 12 and a like number of rollers 13. The retainer body 11 is preferably of a molded construction and is formed from a relatively inexpensive plastic material. The springs 12 are preferably formed of steel strip or wire and the rollers 13, of course, will be of a hardened steel construction. The rollers 13 are conventional, and therefore, the specific details thereof are immaterial.

The retainer body 11 is formed of a pair of side rings 14 and 15 which are connected together by axially extending cross bars 16, the cross bars 16 being equally circumferentially spaced. It is to be noted that the cross bars 16 are connected to the side rings 14 and 15 adjacent the radially inner edges thereof. The side rings hold the rolls and springs in proper axial relationship.

Each cross bar 16 is constructed to readily support one of its springs 12. In addition, each of the cross bars 16 is of a configuration so as to form a seat for an adjacent roller 13, which seat cooperates with an opposing spring 12 to retain the roller within the retainer body 11. It is to be understood at this time that the space between a pair of adjacent cross bars 16 is considered to be in the form of a pocket in which one of the rollers 13 is received, as is clearly shown in FIGURE 1. The pocket is identified by the numeral 17.

Each cross bar 16 has projecting generally radially outwardly therefrom a pair of end lugs 18 and a central lug 20. The end lugs are integrally connected to the side rings 14 and 15 and reinforce the connections between the side rings and the cross bars 16. The two end lugs 18 have coplanar spring engaging surfaces 21 which face in one direction while the lug 20 has a spring engaging surface 22 (FIGURE 3) which faces in the opposite direction and is also coplanar with the surfaces 21.

It is to be noted that the lug 20 is in the form of a segment of a cylinder and is disposed entirely within a radial extension of the respective cross bars 16. On the other hand, the end lugs 21 are positioned adjacent a longitudinal edge of the respective cross bar and projects circumferentially therebeyond, as is best shown in FIGURE 1. That longitudinal edge of each cross bar 16 along which the end lugs 18 are positioned is identified by the numeral 23 and slopes in a manner so as to face generally radially outwardly. The face of each end lug 18 remote from the surface 21 thereof is identified by the numeral 24 and is of an angular configuration in section. It is to be noted that the face 24 of each end lug 18 cooperates with the longitudinal edge 23 of the respective cross bar 16 to define roller receiving seats, which seats are generally identified by the numeral 25.

Each spring 12 is preferably formed from a steel strip of a constant width and thickness and includes a base portion 28 of a length slightly less than the length of the cross bars 16, as is best shown in FIGURE 3. Each spring 12 also includes a pair of arms 29 which are connected to the ends of the base portion 28 by intermediate bight portions 30. The arms 29 are disposed in converging relation and terminate at their free ends in short flanges 32. The flanges 32 are connected to the arms 29 by rounded roller engaging portions 31.

In view of the fact that the surfaces 21 of the end lugs 18 and the surface 22 of the central lug 20 carried by each cross bar 16 lie in a common plane, when a spring 12 is positioned on the respective cross bar 16, the base portion 28 of the spring has the ends thereof deflected and assumes an arcuate configuration opening towards the arms 29. As a result, each spring 12 is resiliently retained in place on its respective cross bar 16.

It will be readily apparent from FIGURE 2 that when a roller is positioned in its respective pocket 17, the roller engaging portions 31 of the arms of the respective spring 12 engage the roller 13 and the arms 29 are swung towards the base portion 28 while a certain degree of bending will take place in the bight portions 30 due to this movement of the arms 29, there will also be a further deflection of the base portion 28 due to the moment couples exerted through the bight portions 30. It is to be further understood that when the retainer assembly 10 is assembled within a conventional outer clutch member and a shaft, the rollers 13 will be forced radially outwardly by the shaft (not shown) so as to project radially beyond the end rings 14 and 15 and into engagement with cam surfaces (not shown) of the outer clutch member. As a result, there will be a further deflection of the springs 12 with the arms 29 thereof being moved further towards the base portions 28.

It is to be noted that the end rings 14 and 15 are provided on their outer peripheral surfaces with projections 33 adjacent each cross bar 16. The projections 33 engage stop surfaces (not shown) on conventional outer clutch members so as to either prevent rotation of the retainer body 11 within the outer clutch member, or to restrict relative rotation between the retainer body and the outer clutch member to very limited angular rotation.

At this time it is also pointed out that in order to provide for the proper positioning of the retainer body 11 within an outer clutch member without binding along the sides thereof, the outer side wall of the end ring 14 is provided with a plurality of buttons 34 and the outer side wall of the end ring 15 is provided with an integral annular projection 35.

It is to be understood that the relationship of the retainer assembly with respect to a conventional outer clutch member is such that when the clutch is engaged, the rollers 13 will be urged more tightly against the springs 12 with a further flexing of the arms 29. Thus, not only are the springs 29 under a constant loading, but also, there is repeated flexure thereof due to the actuation and release of the clutch of which the retainer assembly 10 is a part.

Reference is now made to the schematic showing of FIGURE 5 wherein the loading of the spring 12 is illustrated. The spring 12 is equally loaded toward the ends of the arm 29 by two loadings P/2 wherein P is equal to the total load applied to the spring 12 by the rollers. The load applied on the spring 12 is resisted by opposite and equal loads applied to the ends of the base portion 28, each of these loads also being P/2.

It is to be noted from FIGURE 5 that there are two dimensions shown. The first dimension L is equal to ½ of the distance between the reaction loads applied to the base portion 28. The other dimension $a$ is equal to the distance between adjacent applied loads and reactive loads.

In a simple spring, either of the end supported type or the cantilever type, the maximum allowable stress is determined by the following formula:

$$\text{Max. stress} = \frac{3Eyh}{2L^2} = K$$

where:

E = Modulus of elasticity
y = Deflection in direction of P
h = Thickness of spring
L = Length When the spring is of the end supported type, L is equal to ½ the spacing between the spring supports. On the other hand, when the spring is of the cantilever beam type, L equals the distance between the spring support and the applied load.

It will be readily apparent from the foregoing that with end supported springs and cantilever beam type springs wherein the dimension L is fixed due to the limitations on available space, there is no possibility of providing for a maximum efficiency spring design. On the other hand, with the simply supported bow spring of this disclosure, there is a possibility of varying the relative dimensions of the spring to provide for a most efficient spring design for the particular installation. This is due to the fact that the maximum stress of the spring 12 is determined from the following formula:

$$\text{Max. stress} = \frac{6Eyh}{5\left[a^2 + 2ad + 2d^2 + \frac{6a^2L}{5(a+d)}\right]}$$

Substituting $$K = \frac{3Eyh}{2L^2}$$

then $$\text{Max. stress} = \frac{4KL^2}{5\left[a^2 + 2ad + 2d^2 + \frac{6a^2L}{5(a+d)}\right]}$$

From the foregoing, it will be readily apparent that the retainer assembly 10 has many advantages over prior retainer assembly constructions. Not only do these advantages include a spring which may be designed to have a maximum life under the required operating conditions, but also an assembly which may be economically manufactured and wherein the construction may be varied to meet special operating requirement or unusual environmental conditions, such as high temperatures and lubrication.

Although only a preferred embodiment of the specific retainer assembly has been specifically disclosed and illustrated herein, it is to be understood that minor variations may be made in the retainer assembly construction without departing from the spirit of the invention.

I claim:

1. A retainer assembly for an overrunning clutch comprising a retainer body including a pair of side rims joined together by circumferentially spaced cross bars, said side rims and cross bars defining circumferentially spaced roller receiving pockets separated by said cross bars, and a spring carried by each cross bar and projecting into an adjacent one of said pockets, each spring including a base portion and a pair of converging arms joined to said base portion by intermediate bight portions.

2. The retainer assembly of claim 1 wherein each spring is of the simply supported bow type.

3. The retainer assembly of claim 1 wherein each spring is releasably mounted on the respective cross bars.

4. The retainer assembly of claim 1 wherein each cross bar has lugs engaging opposite surfaces of the base portion of the associated spring to position and retain the respective spring on each cross bar.

5. The retainer assembly of claim 1 wherein each cross bar has lugs engaging opposite surfaces of the base portion of the associated spring to position and retain the respective spring on each cross bar, the lugs of each cross bar being in facing relation and having surfaces engaging opposite faces of said spring base portion with said spring base portion being arcuate.

6. The retainer assembly of claim 1 wherein each cross bar has two lugs and an opposing intermediate lug engaging opposite surfaces of the base portion of the associated spring to position and retain the respective spring on each cross bar, the lugs of each cross bar being in facing relation and having surfaces engaging opposite faces of said spring base portion with said spring base portion being arcuate, all of said spring engaging surfaces of lugs of each of said cross bars lying in a common plane.

7. The retainer assembly of claim 1 wherein each cross bar has two lugs and an opposing intermediate lug engaging opposite surfaces of the base portion of the associated spring to position and retain the respective spring on each cross bar, said two lugs of each cross bar having surfaces cooperating with the respective cross bar defining roller receiving seats opening into an adjacent pocket in opposed relation to the spring of that pocket for cooperation with the respective spring to retain a roller in the respective pocket.

8. The retainer assembly of claim 1 wherein each cross bar has two lugs and an opposing intermediate lug engaging opposite surfaces of the base portion of the associated spring to position and retain the respective spring on each cross bar, said two lugs of each cross bar having surfaces cooperating with the respective cross bar defining roller receiving seats opening into an adjacent pocket in opposed relation to the spring of that pocket for cooperation with the respective spring, and a roller seated in each pocket in clamped relation between the respective seats and spring.

9. The retainer assembley of claim 1 wherein said retainer body is of a molded plastic construction and said springs are formed of sheet metal.

10. The retainer assembly of claim 1 wherein each spring is carried by a cross bar with its base portion in engagement with said cross car and is converging arms extending into an adjacent pocket.

11. The retainer assembly of claim 1 wherein said converging arms have free ends defining roller engaging means.

References Cited

UNITED STATES PATENTS

| 1,850,510 | 3/1932 | Lloyd | 192—45 |
| 2,785,782 | 3/1957 | Dodge | 192—45 |
| 2,835,363 | 5/1958 | Long | 192—45 |
| 3,260,333 | 7/1966 | Benson et al. | 192—45 |
| 3,339,687 | 9/1967 | Cowles | 192—45 |

MARK M. NEWMAN, Primary Examiner

A. D. HERRMANN, Assistant Examiner

U.S. Cl. X.R.

267—1